United States Patent [19]

Lynn

[11] Patent Number: 5,336,308
[45] Date of Patent: Aug. 9, 1994

[54] FLUID FOR PERMANENT IMPRINTING OF TEXTILES AND OTHER POROUS MATERIALS WITHOUT TREATMENT ACCEPTORS AND LONG LASTING CONVEYABILITY IN A SUBSTRATE

[76] Inventor: Joy Lynn, 7341 Clairemont Mesa Bl. #162, P.O. Box 85152MB162, San Diego, Calif. 92186

[21] Appl. No.: 679,291

[22] Filed: Apr. 2, 1991

[51] Int. Cl.$^5$ ............................................. C09D 11/02
[52] U.S. Cl. ................................ 106/19 R; 106/22 R; 106/22 H; 106/311
[58] Field of Search .................... 106/20, 19 R–32, 106/19–22, 311

[56] References Cited

U.S. PATENT DOCUMENTS

| | | | |
|---|---|---|---|
| 2,165,522 | 7/1939 | Taylor et al. | 134/34 |
| 4,207,069 | 6/1980 | Ono | 8/471 |
| 4,270,449 | 6/1981 | Ito et al. | 101/129 |
| 4,610,554 | 9/1986 | Suzuki et al. | 400/124 |

*Primary Examiner*—Helene Klemanski
*Assistant Examiner*—Margaret Einsmann

[57] ABSTRACT

A mixture to which ink, dye or pigments may be added producing an ink mixture which is extremely slow in evaporating from a substrate but which can be used to imprint a permanent, identifiable mark on various types of fabric and requires no acceptor on the fabric, will dry quickly on the fabric and requires no heat setting. An ink mixture which uses the above described mixture and adds to the above mixture dyes, inks, pigments and/or other materials.

8 Claims, No Drawings

FLUID FOR PERMANENT IMPRINTING OF TEXTILES AND OTHER POROUS MATERIALS WITHOUT TREATMENT ACCEPTORS AND LONG LASTING CONVEYABILITY IN A SUBSTRATE

FIELD OF INVENTION

This invention relates to marking fluid such as ink dyes and pigments for imprint on textiles and other porous materials.

DESCRIPTION OF INVENTION

The present invention relates a mixture to which dyes, pigments, inks and other materials may be added, referred to herein as the basic mixture; a mixture which has been colored with dyes, pigments, ink and the like and to which other materials may be added and which provides a fluid for imprinting fabric and other porous materials permanently with ink, dye, or pigment, or other materials without using acceptors in the fabric and without using heat to set the imprint in the fabric, herein referred to as the ink mixture. The basic mixture is extremely slow to evaporate in a substrate allowing inks, pigments and dyes and the like to remain in a conveyable form in a substrate over an extended period of time.

The invention, may be used to mark fabric, paper, vinyl, wood, leather and other porous materials. For the purposes of this description, ink mixture will be used to describe a mixture to which ink, dye, pigments or other materials have been added and the basic mixture will refer to a mixture to which ink, dyes, pigments or other materials may be added to achieve the desired result. The invention is not limited to a mixture to which either pigments, dyes or ink have been added.

The present invention has particular use, but is not limited to, to marking cloth by conveying a colored liquid by a rubber, or like, hand stamp usually with letters or numbers to identify clothing and personal items.

OBJECTS AND ADVANTAGES

Accordingly, several objects and advantages of the invention include but are not limited to the following: Other existing permanent ink formulas dry quickly in a stamp pad and require ink to be supplied with the ink pad to replenish it. In this invention permanent ink, dyes, pigments and the like can be impregnated into a pad and remain wet and in conveyable form over an extended period of time. This invention is safer than existing products because it is not necessary to supply liquid ink in a bottle with the stamp pad to the consumer.

The invention was originally designed to identify children's clothing and sports equipment. Liquid ink, could be ingested by children. In an example herein, it is shown that is possible to have less than 2 ml of ink mixture impregnated into a pad which reaches the consumer. Remarkably this small amount effectively achieves the desired result. Even if the whole pad was ingested by a child, consultation with poison control experts indicate that this would not harm the child. Because the product was designed for households with children, the mixture needed to be non-toxic upon ingestion of small amounts. It is also desirable for the invention to be non toxic to the environment. This invention meets, but is not limited to these criteria.

The elimination of liquid ink for the use of permanent marking of fabric is particularly useful to the military where military personnel must permanently identify their clothing, uniforms, and other belongings. The use of existing inventions where bottles of ink must be poured on the stamp pad is messy, wasteful and time consuming. The handling of bottles of ink by military stores is costly and often results in messy breakages. This invention, while not limited to these criteria, solves these problems. Further objects and advantages of my invention will become apparent from a consideration of the ensuing description, herein.

BACKGROUND OF THE INVENTION

U.S. Pat. No. 4,702,742 Iwata et al (1987), discloses a mixture to keep the ink from drying in a jet ink printing machine. The cloth to be imprinted requires pre-treatment with an acceptor before applying the ink. The mixture disclosed contains some substantial differences to the present invention in components and methods of preparation. For example, the compound is subjected to extensive mixing. The PH balance is adjusted by adding sodium hydroxide. In several examples the mixture was heated, changing the molecular structure of the compound.

U.S. Pat. No. 4,455,168 Togata et al (1984) discloses an ink mixture which is heated, changing the molecular structure of the mixture.

U.S. Pat. No. 5,419,8243, Tanaka (1978) discloses a mixture to mark occlusion in dentistry. The mixture used and the application are substantially different from the present invention.

The present invention is distinguished from all examples of the prior art because it combines a unique combination of ingredients without heating, to provide a mixture which will permanently imprint cloth without the necessity of pre-treatment acceptors in the cloth and will remain permanent in the cloth without heat setting and will remain wet and in conveyable form in the substrate over an extended period of time and yet dry quickly in a porous material to which it is applied. The invention also describes a procedure to impregnate a substrate which will contain the ink mixture in a conveyable form over an extended period of time.

Permanent imprinting of cloth conventionally requires that the cloth be pre-treated by an acceptor such as water soluble or hydrophilic natural or synthetic polymers, to enable the dye or ink or pigments to adhere to the cloth and be permanently imprinted and be able to withstand washing without the dye, pigments or ink being removed from the cloth. Additionally, permanent imprinting of cloth usually requires that the fabric be heat treated after imprinting for the purpose of setting the dye, ink or pigments in the fabric permanently.

Ink pads are known in which the ink does not dry out immediately in the ink pad, but the ink in these ink pads will wash out of cloth.

Permanent ink is known which, when poured on a stamp pad, can be used to imprint fabric and other porous surface and remains permanent on these surfaces. However, such ink dries quickly on the ink pad and additional ink must be supplied to replenish the ink pad.

At present there is no device, method, or chemical mixture for maintaining or containing permanent ink, dyes, pigments or the like in a conveyable form over an extended period of time to imprint textiles and other porous surfaces except for the above described liquid ink contained in bottles with its attendant disadvantages, or inks, dyes, pigments or the like which require treatment acceptors and heat setting which is costly and cumbersome.

In contrast this invention provides a product in which permanent ink, dyes, pigments or the like remain in a wet and conveyable in the substrate over an extended period of time. There is a need for this invention anywhere that clothing and personal items require identification. Such places include but are not limited to children's camps, the military, hospitals, prisons, nursing homes, little league baseball, school uniforms and like institutions.

For purposes of the present invention, permanently imprinted refers to the ability of the cloth to withstand 12 washings of detergents commonly used in households and the imprint of letters or numbers remains readable after the 12th washing.

SUMMARY OF THE INVENTION

To overcome these disadvantages, it is an object of the present invention to provide a mixture and a procedure which would result in permanent ink in a long lasting conveyable form which can be used to imprint fabric and other porous materials without the ink hardening and drying in the pad and without requiring a pre-treatment acceptor in the fabric or other porous materials, and without requiring heat setting of the ink dye or pigments in the materials. The basic mixture meets this objective. Furthermore, other materials, such as dyes, inks, pigments, and the like and thickeners, gelling, congealing and viscous agents and the like may be added to the basic mixture to achieve the objective. The addition of these materials forms the ink mixture which further achieves the objectives.

DETAILED DESCRIPTION OF PREFERRED EMBODIMENTS

The mixture of the present invention is preferably diethylene glycol mono butyl ether from $66\frac{2}{3}\%$ to 85% by volume; glycerine from $33\frac{1}{3}\%$ to 15% by volume; traces of ethylene glycol; 0.045% by volume; and monoethanolamine 0.0075% by volume are added to enhance flow. Various inks, dyes and pigments may be added to this mixture to form an ink mixture. A preferred ink mixture is ink which is permanent on fabric and porous surfaces and is preferably a glycol based permanent ink. From 33% to 41% may be added to diethylene glycol mono butyl ether from 37% to 51% by volume and glycerine from 20% to 24% by volume to form the ink mixture; traces of ethylene glycol; 0.045% by volume and monoethanolamine 0.0075% by volume may be added to enhance flow.

For the purposes of this invention it is necessary to distinguish between a basic mixture to which the ink, dyes and pigments are added and will herein be called "basic mixture" and a mixture which includes the ink, dyes and pigments and will herein be called an "ink mixture".

EXAMPLE 1

A commercial embodiment for the basic mixture is: 8 ml Diethylene glycol mono butyl ether; 4 ml glycerine; and traces of 1 drop of monoethanolamine and 3 drops of ethylene glycol may be added to enhance flow. This is the basic mixture.

EXAMPLE 2

A commercial embodiment for a black permanent ink mixture is: To the basic mixture is added 7 ml permanent black or india ink to form an ink mixture.

The butyl ether, glycerine, monoethanolamine and ethylene glycol are combined in a bottle at room temperature. Ink is added to the mixture and the bottle is shaken vigorously for 2 minutes.

EXAMPLE 3

1,080.7 ml of diethylene glycol mono butyl ether, 506.88 ml of glycerine, 887.1 ml permanent ink, 128.38 ml ethylene glycol and 20.27 ml monoethanolamine were mixed by shaking the mixture in a 3 liter bottle at room temperature. The bottle was shaken for 2 minutes.

EXAMPLE 4

84.75 tablespoons Polyvinyl Pyrrolidone (DVP) was added to the mixture cited in example 3 above. Said ink mixture was put in blender and said PVP was added slowly during the blending process. This additional ingredient thickens the ink mixture, keeps it from leaking out of a foam ink pad and adds additional darkness and clarity to the imprint of the ink on fabric to which it is applied.

EXAMPLE b 5

To the mixture cited in example 3 above the following were added: 42.38 tablespoons guar gum, 53 tablespoons fumed silica and 0.01 ml dimethyl benzyl ammonium chloride to prevent mould growth.

The ink mixture was placed in a blender on high at room temperature. The guar gum and fumed silica were added slowly while blending. The mixture was further blended for 3 minutes. The addition of these chemicals thickened the ink causing a darker and clearer impression while preventing the ink from leaking out of a foam pad. These chemicals are somewhat more economical than PVP.

Mixed with some dyes pigments, and glycol based permanent inks, the ink mixture is permanent on the cloth and other porous surfaces. The basic mixture causes the ink, dye or pigments to remain wet and in conveyable form in the substrate for extended periods of time however when applied to cloth, the mixture is absorbed immediately leaving a clear long lasting impression on the cloth.

For example: A felt pad so treated was left open to dry in the air. No signs of drying appeared for six weeks. The ink mixture was still in conveyable form. The pad was then usable for an additional two weeks although the print was no longer solid.

In another example a pad was kept closed and opened for ordinary use from time to time. This pad showed no signs of drying for one year. The ink remained in conveyable form and provided solid printing for one year.

TESTING

Mixed with a glycol based permanent ink, and using a felt pad and rubber hand stamp to imprint the fabric, this mixture was tested by washing fabric so imprinted 12 times with common household detergents.

The following fabrics were used for testing purposes:
1. 100% cotton denim
2. Spandex
3. Polyester blend 65% polyester, 35% cotton
4. 100% cotton 5. Polyester Pile
6. 100% polyester
7. Cotton sweat shirt
8. Polyester knit
9. Nylon
10. Polyester blend "Duck"

The results were superior on cotton, spandex and most of the polyester blends, and the imprinting on all fabrics was readable after 12 washes.

SUMMARY, RAMIFICATION AND SCOPE OF INVENTION

While the above description contains many specificities these should not be construed as limitations on the scope of the invention, but rather as an exemplification of one preferred embodiment thereof. Many other variations are possible. For example: Future uses of this ink mixture may include jet ink printing of fabric which will not require pre-treatment with fabric acceptors. Various dyes, pigments and inks may be added to the original mixture for variations in colors and properties. For example, the addition to the basic mixture of titanium dioxide, a binder and thickener should provide a white ink with the same above described properties. Addition of a blue pigment, dye or ink would provide a blue ink with the same above described properties, etc.

Thus, the scope of the invention should be determined not by the embodiments described herein, but by their appended claims and their legal equivalents.

What is claimed is:

1. A mixture to which ink, dye or pigments or other materials may be added producing a mixture which is extremely slow to evaporate from a substrate allowing inks, pigments and dyes to remain in a conveyable form in a substrate over an extended period of time, said mixture consisting of diethylene glycol mono butyl ether from approximately 66⅔% to approximately 85% by volume and glycerine from approximately 33⅓% to approximately 15% by volume.

2. A mixture to which ink, dye or pigments or other materials may be added producing a mixture which is extremely slow to evaporate from a substrate allowing inks, pigments and dyes to remain in a conveyable form in a substrate over an extended period of time, said mixture consisting of diethylene glycol mono butyl ether from approximately 60% to approximately 85% by volume; glycerine from approximately 40% to approximately 15% by volume and traces of ethylene glycol approximately 7% by volume and monethaonolamine approximately 1% by volume.

3. A mixture for permanently imprinting textiles and other porous surfaces comprising approximately 37% to approximately 51% diethylene glycol mono butyl ether by volume; approximately 20% to approximately 24% glycerine by volume; and approximately 33% to approximately 41% by volume of ink, dye or pigment.

4. A mixture for permanently imprinting textiles and other porous surfaces comprising approximately 37% to approximately 51% diethylene glycol mono butyl ether by volume; approximately 20% to approximately 24% glycerine by volume; approximately 33% to approximately 41% by volume of ink, dye or pigment and traces of ethylene glycol approximately 4.5% by volume and monoethanolamine approximately 0.75% by volume.

5. The invention according to claim 3 including titanium dioxide as pigment, and further a thickening, dispersing, gelling, or suspending agent.

6. The invention of claim 5 wherein said thickening agent comprises polyvinylpyrrolidone.

7. The invention of claims 3 or 4 further including any combination of thickening, gelling, viscous or congealing agents.

8. The invention of claim 5 including as thickening, gelling or viscous agent fumed silica or guar gum or both.

* * * * *